(12) United States Patent
Jonuscheit (10) Patent No.: US 11,326,657 B2
(45) Date of Patent: May 10, 2022

(54) ELECTROHYDRAULIC TRANSMISSION CLUTCH OF A MOTOR VEHICLE

(71) Applicant: AUDI AG, Ingolstadt (DE)

(72) Inventor: Michael Jonuscheit, Nuremberg (DE)

(73) Assignee: AUDI AG, Ingolstadt (DE)

(*) Notice: Subject to any disclaimer, the term of this patent is extended or adjusted under 35 U.S.C. 154(b) by 396 days.

(21) Appl. No.: 15/774,326

(22) PCT Filed: Oct. 27, 2016

(86) PCT No.: PCT/EP2016/075879
§ 371 (c)(1),
(2) Date: May 8, 2018

(87) PCT Pub. No.: WO2017/080834
PCT Pub. Date: May 18, 2017

(65) Prior Publication Data
US 2020/0256408 A1  Aug. 13, 2020

(30) Foreign Application Priority Data
Nov. 9, 2015 (DE) .................. 10 2015 222 007.9

(51) Int. Cl.
*B62M 9/122* (2010.01)
*F16D 48/06* (2006.01)
*B60W 10/02* (2006.01)

(52) U.S. Cl.
CPC ......... *F16D 48/066* (2013.01); *B60W 10/023* (2013.01); *F16D 2500/1026* (2013.01);
(Continued)

(58) Field of Classification Search
CPC .......................... F16D 48/066; B60W 10/023
(Continued)

(56) References Cited

U.S. PATENT DOCUMENTS

| 5,337,868 A | 8/1994 | Liu et al. |
| 5,807,209 A * | 9/1998 | Matsubara ............ B60W 10/02 477/176 |

(Continued)

FOREIGN PATENT DOCUMENTS

| CN | 1082998 A | 3/1994 |
| CN | 1727736 A | 2/2006 |

(Continued)

OTHER PUBLICATIONS

Machine Translation of DE 102014203219A, Sep. 2014 (Year: 2014).*

(Continued)

*Primary Examiner* — Charles A Fox
*Assistant Examiner* — Michael E Butler
(74) *Attorney, Agent, or Firm* — Maier & Maier, PLLC (57) ABSTRACT

A method for operating an electrohydraulic transmission clutch of a motor vehicle, wherein, for a clutch operation, a hydraulic pressure is set by way of a regulating device of a controller as a function of a clutch signal, and, through the pressure, a disengagement element of the transmission clutch is moved through a soft region into a rigid region via a rigid point, or vice versa. The soft region is to be compensated for. Further, as a function of the clutch signal, the regulating device generates a preliminary target value signal for the pressure and a time derivative of the preliminary target value signal is generated as a movement signal, and a pilot control generates a pilot control signal as a function of the movement signal, and the preliminary target value signal and the pilot control signal are combined to give a final actuating value signal for the pressure.

7 Claims, 10 Drawing Sheets

(52) U.S. Cl.
CPC .............. *F16D 2500/10412* (2013.01); *F16D 2500/3024* (2013.01); *F16D 2500/3166* (2013.01); *F16D 2500/31413* (2013.01); *F16D 2500/7041* (2013.01)

(58) Field of Classification Search
USPC .......................................................... 701/67
See application file for complete search history.

(56) References Cited

U.S. PATENT DOCUMENTS

| | | | |
|---|---|---|---|
| 6,647,332 B1 | 11/2003 | Esterby et al. | |
| 8,287,433 B2 * | 10/2012 | Kishii | E02F 9/2079 |
| | | | 477/181 |
| 2002/0000353 A1 * | 1/2002 | Katou | F16H 57/0482 |
| | | | 192/70.12 |
| 2006/0025281 A1 | 2/2006 | Nozaki et al. | |
| 2006/0128527 A1 | 6/2006 | Zenno et al. | |

FOREIGN PATENT DOCUMENTS

| | | |
|---|---|---|
| CN | 1786500 A | 6/2006 |
| DE | 19652244 B4 | 6/1997 |
| DE | 10223465 A1 | 12/2002 |
| DE | 10236540 A1 | 2/2003 |
| DE | 10 2006 042 393 A1 | 3/2008 |
| DE | 102006042293 A1 | 3/2008 |
| DE | 102007054726 B3 | 7/2009 |
| DE | 102010033853 A1 | 2/2012 |
| DE | 102014203219 A1 | 9/2014 |
| EP | 1858739 B1 | 1/2010 |
| EP | 2143966 A1 | 1/2010 |
| FR | 3019124 A1 | 10/2015 |

OTHER PUBLICATIONS

German Office Action dated Sep. 20, 2019, in connection with corresponding DE Application No. 10 2015 222 007.9 (10 pgs., including machine-generated English translation).

Communication pursuant to Article 94(3) EPC issued on Mar. 28, 2019 in corresponding European patent application No. 16790925.8 including partial machine-generated English language translation; 4 pages.

International Search Report and Written Opinion dated Feb. 24, 2017 of corresponding application No. PCT/EP2016/075879, 11 pgs.

German Search Report dated Jul. 6, 2016 of corresponding application No. DE10 2015 222 007.9, 7 pgs.

Translation of International Preliminary Report on Patentability dated May 24, 2018 of corresponding application No. PCT/EP2016/075879, 6 pgs.

Office Action dated Mar. 26, 2019 in corresponding Chinese Application No. 201680078130.4; 15 pages.

\* cited by examiner

ELECTROHYDRAULIC TRANSMISSION CLUTCH OF A MOTOR VEHICLE

FIELD

The invention relates to a method for operating an* electrohydraulic transmission clutch of a motor vehicle, by means of which an actuation of a clutch pedal is assisted. The invention also includes a controller for the transmission clutch as well as a motor vehicle having the controller.

BACKGROUND

A weak point of present-day clutch actuators is the variance of the pressure buildup in the soft region and the rigid region of the clutch. In driving operation, this deficient pressure response behavior leads to limitations in comfort and/or to irritations of the user.

Responsible for the variance is, first and foremost, the displaced volume of the clutch, which is determined by the volume that arises during movement of the clutch cylinder in order to move a disengagement element of the clutch. The clutch pack is moved by means of the disengagement element. The clutch region between the gripping point of the clutch and up to the rigid region is referred to as the soft region of the clutch. In the soft region of the clutch, it is necessary for the clutch cylinder to move further for a change in pressure in the hydraulic system that moves the disengagement element than in the rigid region.

These relationships are explained in detail once more on the basis of FIG. 1 to FIG. 4.

Figure 1:
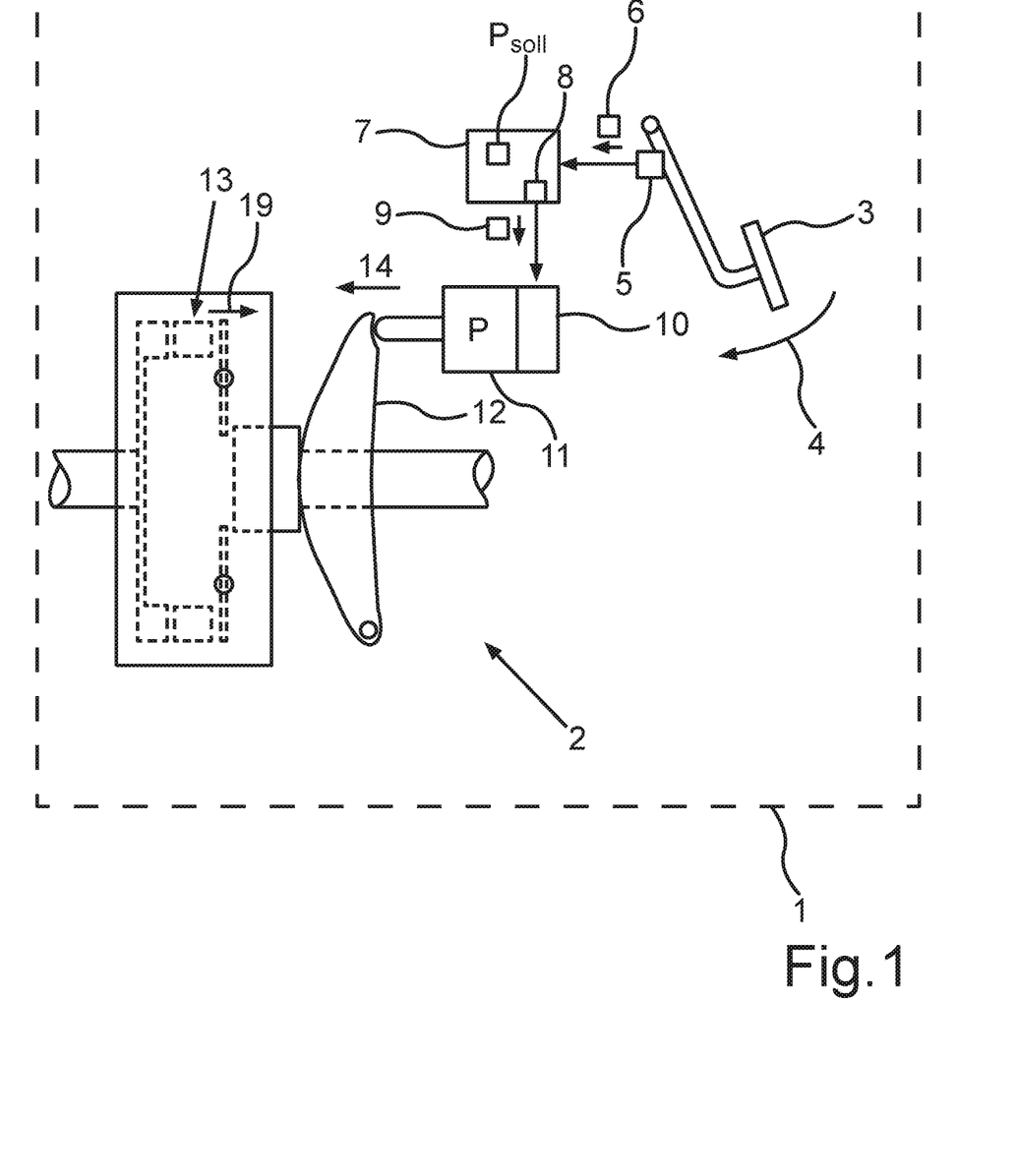
FIG. 1 a schematic illustration of a motor vehicle, in which an electrohydraulic transmission clutch with a controller is provided.

FIG. 1 shows a transmission clutch 2 and a clutch pedal 3 of a motor vehicle 1. During a movement 4 of the clutch pedal 3, this movement is detected by a sensor 5, which, as a function of the movement 4, generates a clutch signal 6 of the clutch pedal 3. A controller 7 generates a control signal 9 at an actuating output 8, which is transmitted to an actuator 10 of the transmission clutch 2. The actuator 10 can be formed, for example, on the basis of an electric machine or a controllable valve. Depending on the control signal 9, a hydraulic pressure P of a hydraulic drive 11 is set using a tappet 11' for a disengagement element 12 of the transmission clutch 2 by way of the actuator 10. The actuator 10 and the hydraulic drive 11 together constitute a controllable hydraulic device. By means of the disengagement element 12, a clutch pack 13 is moved in a way that is known in and of itself, said clutch pack 13 providing the actual force coupling between the motor and the transmission and being able to comprise, for example, the clutch pressure plate with its friction lining, which is known in and of itself.

Figure 2:
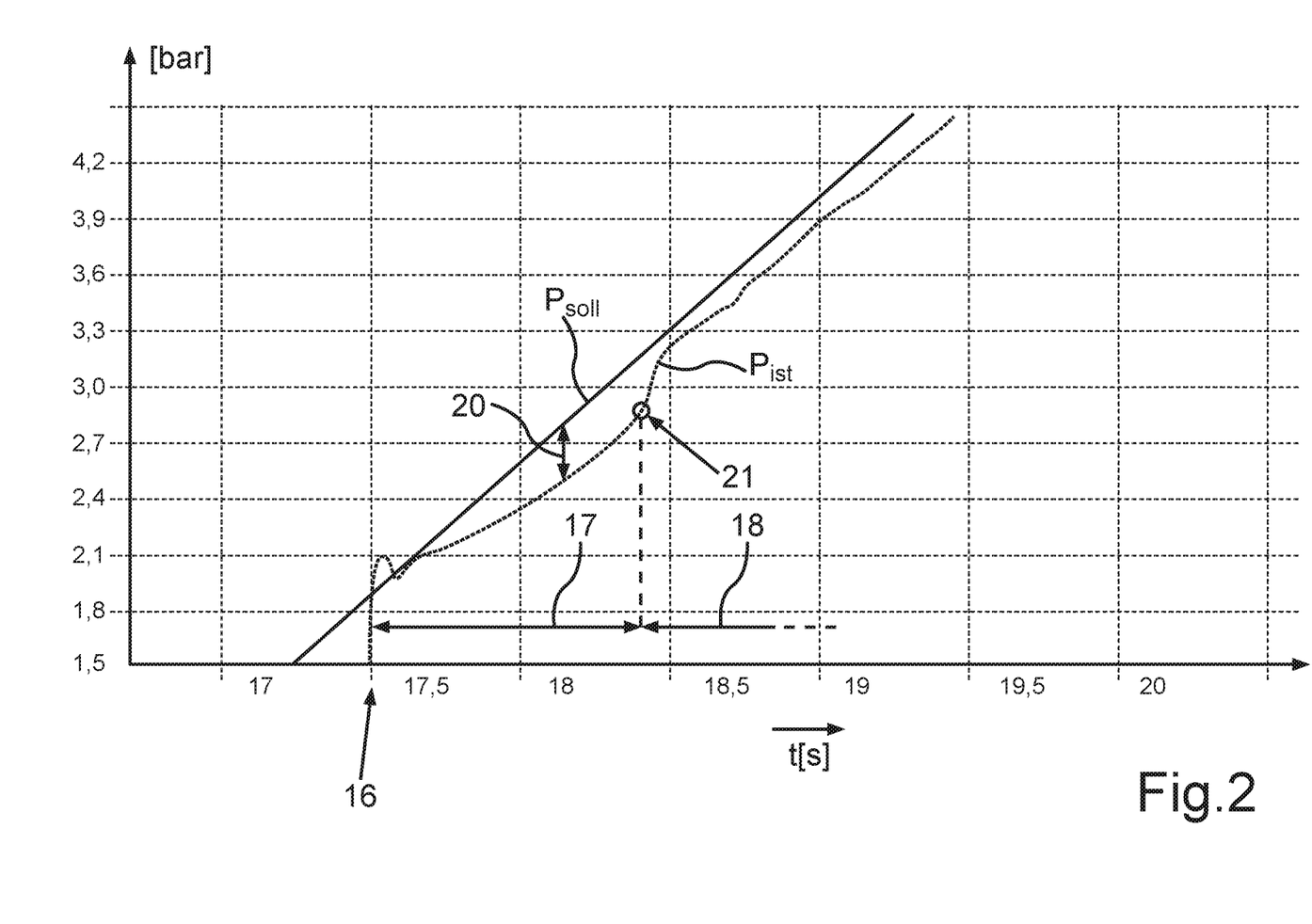
FIG. 2 a diagram with time courses of pressure signals.

For generating the control signal 9, a target value signal Psoll ["Ptarget"] for the pressure P is generated by the controller 7 as a function of the clutch signal 6. During the continuous movement 4, the pressure P follows the target value signal Psoll, albeit initially only with a lag. This is illustrated in FIG. 2. FIG. 2 shows the course of the target value signal Psoll over the time t, on the one hand, and the time course of the pressure P [on the other hand]. The schematic construction of the transmission clutch 2 illustrated in FIG. 1 is presented only by way of example. What is crucial is the ratio of the target value signal Psoll to the pressure P, which is illustrated in FIG. 2.

Through the increase in the pressure P, a movement 14 of the disengagement element 12 is brought about via the tappet 11', and, if possible, is intended to correspond to the movement 4 of the clutch pedal 3. The movement begins at a gripping point 16, starting from which point the clutch pack 13 responds to the movement of the disengagement element 12. What ensues is a soft region 17, in which the disengagement element 12 has to be moved more in comparison to a following rigid region 18 in order to bring about a predetermined path of an adjusting movement 19 of the clutch pack 13. Accordingly, a large volume of hydraulic fluid has to be moved in the hydraulic drive 11. Therefore, this gives rise to the lag illustrated in FIG. 2 or to the tracking error 20 between the target value signal Psoll and the pressure P. From a rigid point 21 on, the ratio of the clutch movement 19 of the clutch pack 13 to the movement 14 of the disengagement element 12 increases. As a result, a ratio of a change in the pressure P to the movement 14 of the disengagement element 12 is also greater than in the soft region 17. From the rigid point on, the clutch cylinder, which moves the disengagement element 12, moves relatively much less.

This is the beginning of the rigid region 18, in which, in relation to the soft region, less hydraulic volume has to be moved in order to bring about a rise in pressure. In the soft region 17, a deficient pressure response behavior results. The described operation is dynamic; that is, it is noticeable, in particular, only during the movement 4 of the clutch pedal 3. For this reason, movement and change are addressed here.

Figure 3:
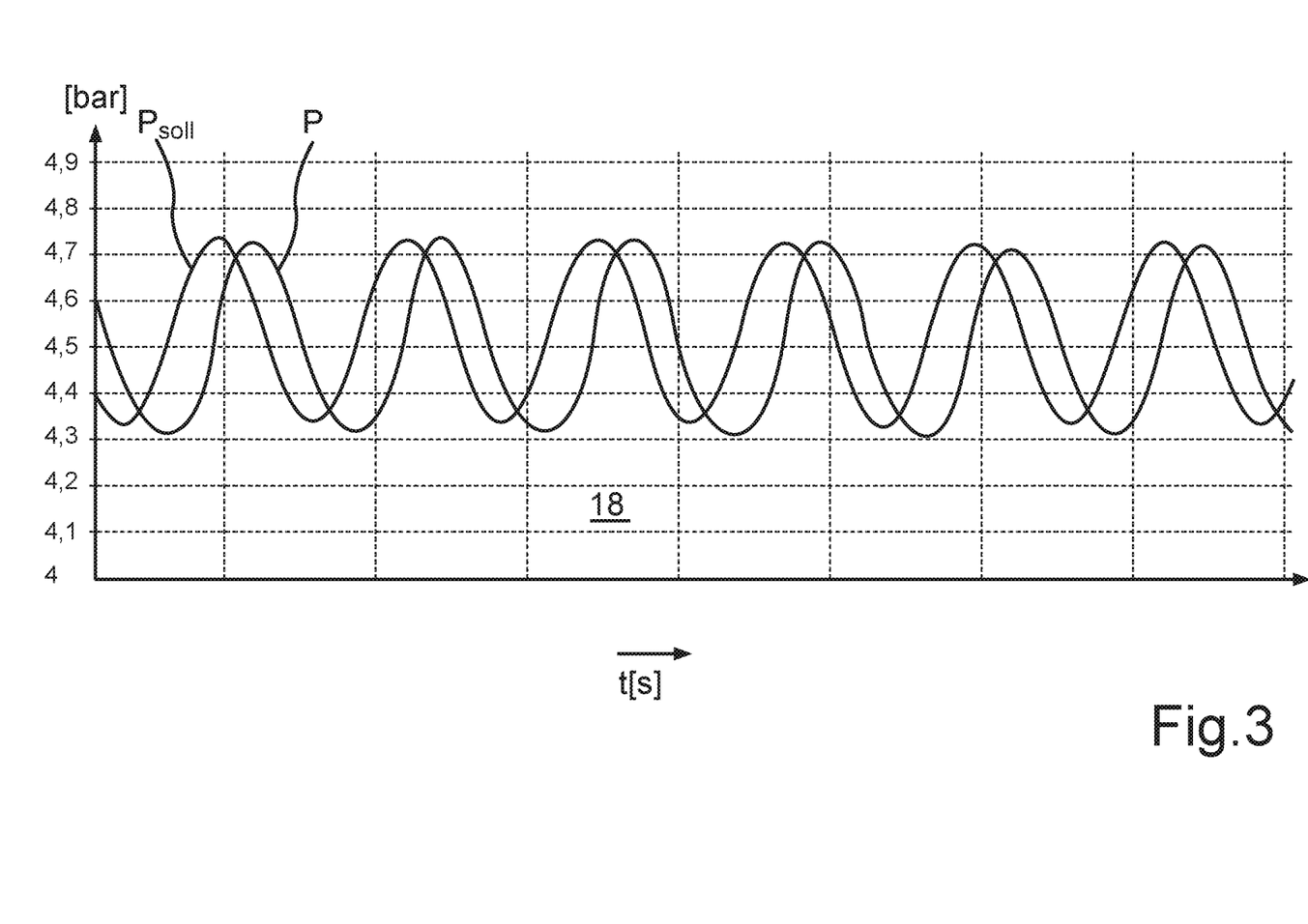
FIG. 3 a diagram with time courses of pressure signals in the rigid region during a periodic movement of a clutch pedal.
Figure 4:
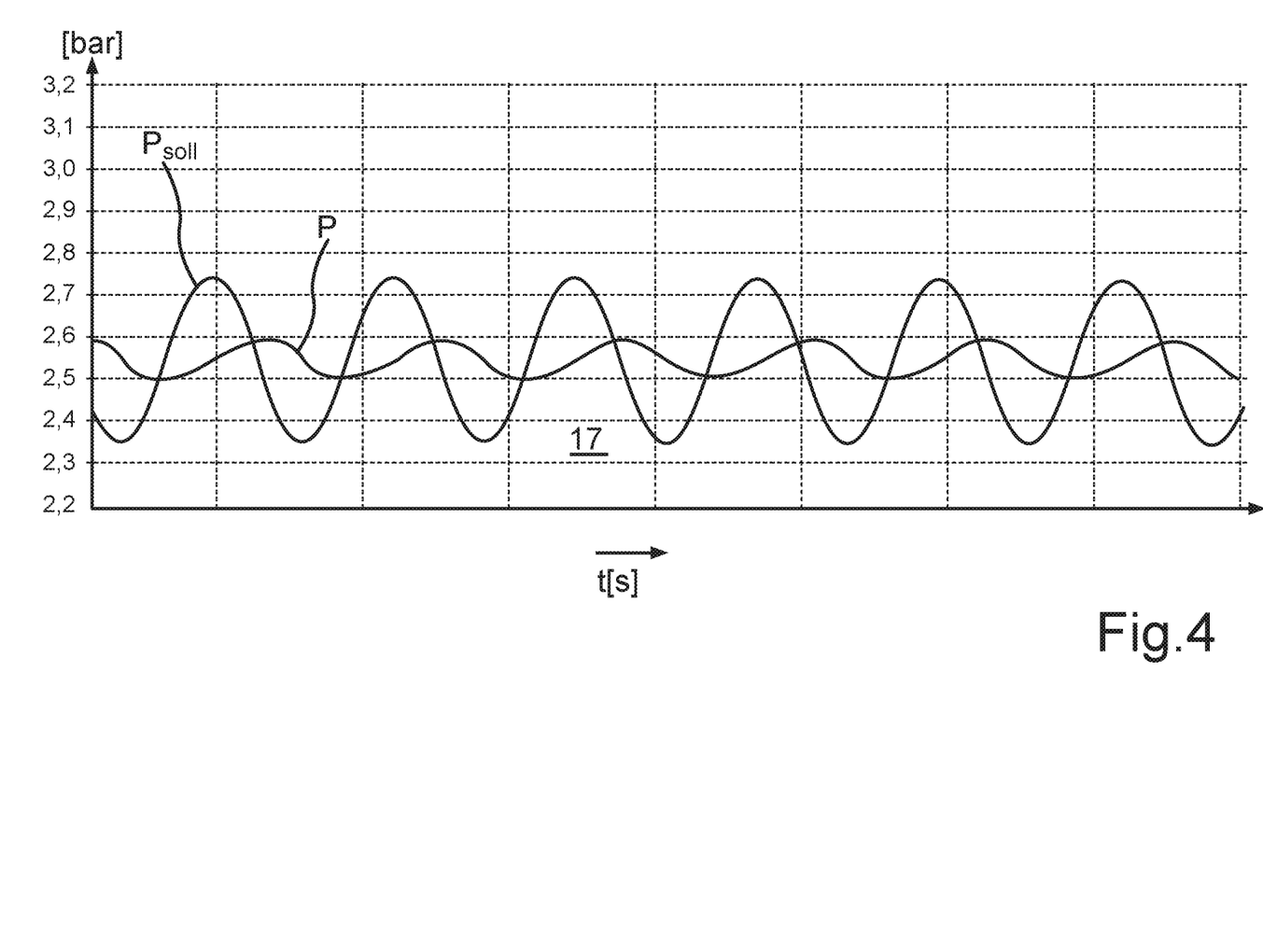
FIG. 4 a diagram with time courses of pressure signals in the soft region during the periodic movement of the clutch signal.

This is illustrated in FIG. 3 and FIG. 4. FIG. 3 shows the target value signal Psoll and the time course of the pressure P in the rigid region 18 for a periodic or sinusoidal movement of the clutch pedal 3 when the position of the disengagement element 12 is located in the rigid region 18. In contrast, FIG. 4 shows the target value signal Psoll and the finished course of the pressure P in the soft region 17. The periodicity or frequency of the periodic movement 4 of the clutch pedal 3 is 4 Hertz in the example shown. Comparison of FIG. 3 and FIG. 4 reveals that, for said dynamic operation in the soft region 17, the pressure P follows the target value signal Psoll with a lower amplitude than in the rigid region 18.

It is greatly desired to compensate for said tracking error 20 or the deficient pressure response behavior.

Known from DE 102 36 540 A1 is a method that determines the gripping point 16 as a function of a clutch temperature and takes it into consideration during the actuation of a clutch.

Known from DE 196 52 244 B4 is a method for determining the gripping point, which, for this purpose, imposes two different motor torques on the clutch and determines the gripping point 16 from the difference in torque.

Known from EP 1 858 739 B1 is how to obtain a precise actuated torque pulse by providing a control unit for the purpose of recording a temperature of the clutch and correcting the target position of the clutch as a function of the recorded temperature.

Known from DE 102 23465 A1 is how to plot a characteristic curve for the actuation of a clutch, wherein said characteristic curve defines a target position of the clutch, which is adjusted by an actuating device as a function of the torque to be transmitted by the clutch in each instance. The required torque to be transmitted ensues from the driver's wish or from the position of the accelerator pedal, and, for example, from the load on the internal combustion engine that is detected by the sensor, as well as, under certain circumstances, from further operating parameters, such as the rotational speed of the motor. The characteristic curve changes intermittently in consequence of changes in temperature, for example, and, in the long term, it changes over the course of the service life of the clutch, owing to wear, for example. It is therefore readjusted according to diverse strategies when predetermined operating conditions are present.

SUMMARY OF THE DISCLOSURE

The invention is based on the object of adapting the pressure response behavior of a transmission clutch in the soft region in such a way that, in said region, a behavior of the transmission clutch that is similar to its behavior in the rigid region is obtained.

The object is achieved by the subjects of the independent patent claims. Advantageous enhancements of the invention are presented by way of the features of the dependent patent claims, the following description, and the figures.

The invention makes available a method for operating an electrohydraulic transmission clutch of a motor vehicle. The method is carried out in an engagement operation and/or disengagement operation, during which, for example, a clutch pedal is moved by a driver. In the following, a clutch operation is uniformly addressed. By way of a regulating device of a controller, a hydraulic pressure is set as a function of a clutch signal. The clutch signal can be generated, for example, by a sensor, as a function of a pedal position of a clutch pedal, or by a transmission control of an automatic transmission. As a result of the pressure, in the described way, a disengagement element of the transmission clutch is moved through a soft region into a rigid region via a rigid point, or vice versa. "Vice versa" means that the movement occurs from the rigid region through the soft region via the rigid point. The described problem here results that, during dynamic clutch operation, a ratio of a change in the pressure P to the movement of the disengagement element is less in the soft region than in the rigid region. For this reason, for changing the pressure P, more hydraulic fluid has to be moved when the disengagement element is situated in the soft region in order that the pressure is set to a specific target pressure value. In other words, the pressure value follows the target value signal of the regulating device with a time constant. In other words, during pressure buildup or pressure decline, a tracking error ensues between the current target value signal of the regulating device, [on the one hand], and the actual pressure value or the time course of the pressure, on the other hand. The target value signal of the regulating device is the output signal thereof, by means of which said hydraulic device can be controlled for setting the pressure. For example, for this purpose, the hydraulic device can have a controllable valve.

In order to compensate for the soft region, that is, to make a ratio of the change of the clutch signal over time to the change in pressure in the soft region similar to that in the rigid region, it is provided that, as a function of the clutch signal, the regulating device generates a preliminary target value signal for the pressure, and the controller generates a time derivative of the preliminary target value signal. The time derivative is used as a movement signal. The pressure in the soft region is then additionally set by a pilot control of the controller as a function of the movement signal. In other words, the hydraulic pressure is set not only as a function of the current value of the clutch signal (static quantity), but, in addition, a pilot control signal is generated when there is a change over time of the clutch pedal (dynamic quantity), said pilot control signal setting the pressure as a function of the change in the clutch signal. For this purpose, the pilot control generates the pilot control signal as a function of the movement signal, that is, as a function of the time derivative described. By way of the controller, the preliminary target value signal and the pilot control signal are combined to give a final actuating value signal for the pressure. In accordance with the invention, therefore, the hydraulic device is then controlled by means of the final actuating value signal, instead of only by means of the preliminary target value signal.

The invention affords the advantage that, in the soft region, hydraulic fluid is moved faster or more vigorously or with a greater volume flow thus* without the pilot control. As a result, the transmission clutch responds to the clutch signal with a shorter response time in the soft region and, in this way, can move the disengagement element faster to the respective final position corresponding to the current value of the more rapidly signal than without pilot control.

The invention also includes optional enhancements, through the features of which additional advantages ensue.

One enhancement provides that, by way of the pilot control, the movement signal (that is, the time derivative of the preliminary target value signal) is scaled with a pilot control factor, and said pilot control factor is set as a function of at least one operating variable of the motor vehicle. In an advantageous way, the influence of the pilot control thereby depends on the operating variable of the motor vehicle. In connection with the invention, an operating variable is a value that depends on a current operating state of the motor vehicle.

For this purpose, one enhancement provides that the at least one operating variable comprises at least one temperature. In this way, the pilot control is temperature-dependent. In an advantageous way, this compensates for the temperature-dependent behavior of the transmission clutch actuation.

One enhancement provides that, as a function of the at least one operating variable, the pilot control factor is determined by means of an assignment device, in particular a characteristic field or a parametric function, and the assignment device is adapted in the operation of the motor vehicle, as a function of the time constant with which a time signal of the pressure follows the preliminary target value signal or the final actuating value signal. In other words, the characteristic field of the pilot control factor is measured online. As a result, over the running time, the property of the hardware is learned online. Accordingly, it is possible to compensate for a component scatter. For example, the time constant can be measured as an actuating value signal by means of a step or jump function.

One enhancement provides that, as a function of a difference between the actual pressure and a pressure that is obtained in the rigid point, the pilot control factor is set. In this way, in an advantageous way, the pilot control can be blanked out or else reduced gradually or in a ramp-like manner as the disengagement element approaches the rigid point.

In particular, it is provided in this connection that the pilot control is active only in the soft region. Therefore, in particular, the pilot control is not active in the rigid region. This affords the advantage that the advantageous behavior of the clutch transmission remains uninfluenced in the rigid region.

As already stated, the invention also includes the controller for an electrohydraulic transmission clutch of a motor vehicle. The controller has the described actuating output for adjusting an electric actuator for setting a hydraulic pressure for moving a disengagement element of the transmission clutch. The controller is hereby equipped to carry out an embodiment of the method according to the invention. For this purpose, the controller can have a processor device, for example. The processor device can be created, for example, on the basis of a microcontroller or a microprocessor. The regulating device and the pilot control can be made available as program modules of the processor device.

Finally, the invention also includes a motor vehicle having the electrohydraulic transmission clutch, for which an embodiment of the controller according to the invention is provided. In addition, the transmission clutch has the described electric actuator for setting the hydraulic pressure, by means of which a disengagement element of the transmission clutch is moved.

BRIEF DESCRIPTION OF THE DRAWINGS

In the following, an exemplary embodiment of the invention is described. Shown are.

DETAILED DESCRIPTION

In the exemplary embodiment explained in the following, what is involved is a preferred embodiment of the invention. In the exemplary embodiment, the described components of the embodiment each represent individual features of the invention that are to be regarded independently of one another and that each further develop the invention independently of one another and hence are also to be regarded, individually or in a combination different from that shown, as a component of the invention. Furthermore, the described embodiment can also be augmented by additional features of the already described features of the invention.

In the figures, functionally identical elements are furnished with the same reference numbers.

In the following, it is assumed then that FIG. 1 represents an embodiment of the motor vehicle 1 according to the invention. For the explanation of the elements illustrated in FIG. 1, therefore, reference is made to the introduction of the description. A difference from the introductory description is that the motor vehicle 1 according to the invention has one embodiment of the controller 7 according to the invention.

Figure 5:
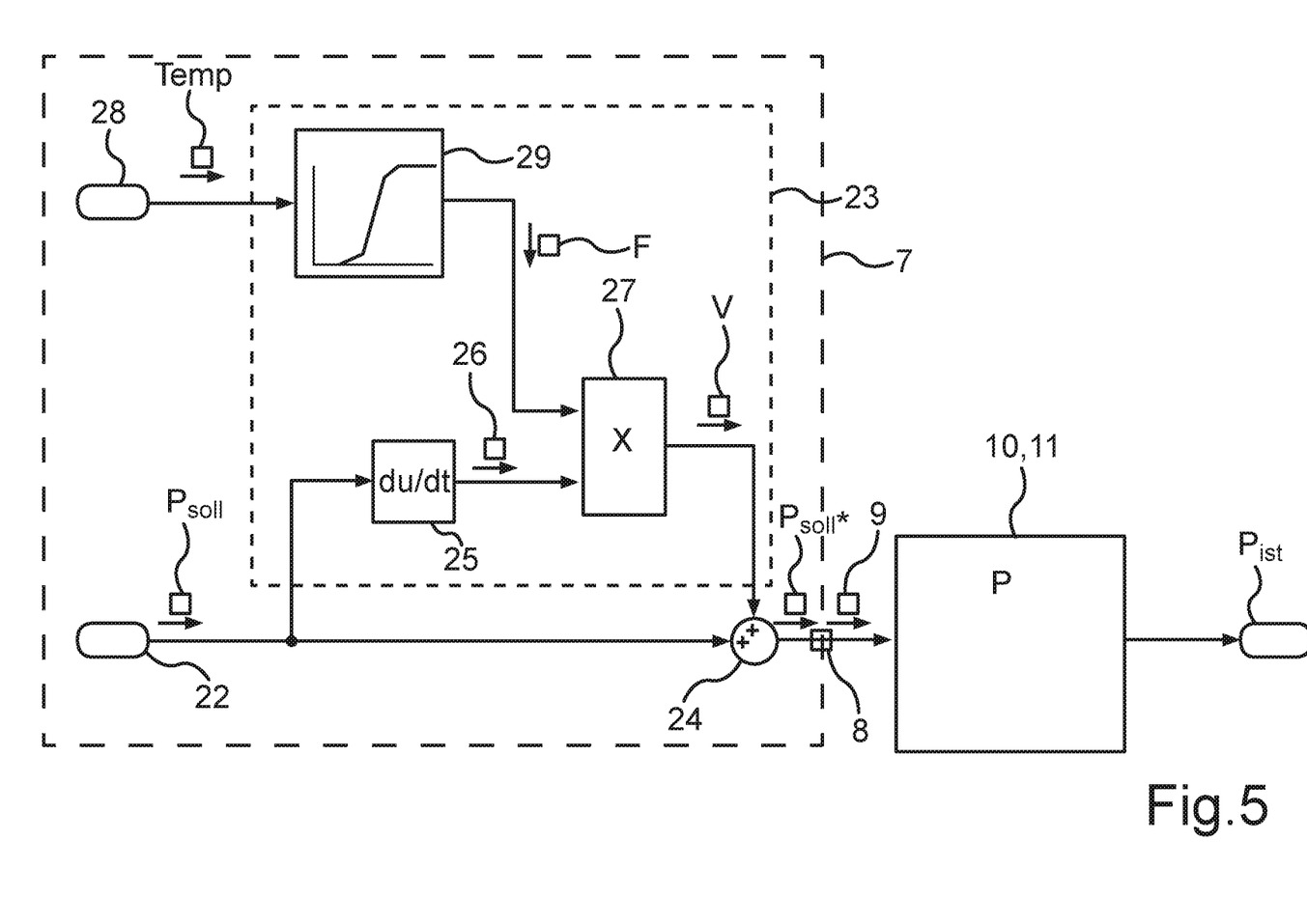
FIG. 5 a schematic illustration of one embodiment of the controller according to the invention, FIG. 6 the controller of FIG. 5 in a specific configuration.

For this purpose, FIG. 5 shows the controller 7, as it is connected at the control loop that is formed from the actuator 10 and the hydraulic drive 11. The controller 7 can receive an actual value Pist ["Pactual]" of the pressure P for a control. The control can be effected in the known way by a regulating device 22. By means of the regulating device 22, a simple control can occur—for example, by simple scaling of the clutch signal 6. The controller 7 additionally has a pilot control 23. A preliminary target value signal Psoll of the regulating device 22 is combined with a pilot control signal V by a summing unit 24 to give a final actuating value signal Psoll*. The final actuating value signal Psoll* is then provided as a control signal 9 at the signal output 8. It is possible in this way, for example, to provide an impedance matching. In the described way, the preliminary target value signal Psoll can be generated as a function of the clutch signal 6, which continuously describes the pedal position of the clutch pedal 3 during the movement 4.

The pilot control 23 generates a derivative signal 26 from the preliminary target value signal Psoll by means of a derivative 25. Accordingly, the derivative signal 26 then always has a value different from 0 when the position of the clutch pedal 3 changes. The derivative signal 26 is multiplied by a pilot control factor F by means of a multiplier 27, with the resulting product giving the pilot control signal V. The pilot control factor F is set as a function of at least one operating variable of the motor vehicle 1. In the example, an operating variable is a temperature Temp that can be recorded at a measurement input 28 by a temperature sensor 28, for example. The temperature Temp describes, in particular, the temperature of a hydraulic oil.

The pilot control factor F can be formed on the basis of a characteristic field 29, from which, as a function of the temperature Temp, a characteristic curve can be chosen. Another operating variable can be, for example, the actual pressure value Pist, which indicates how far away the actual pressure Pist is from the rigid point 21. For this purpose, a difference ΔP can be calculated as the difference between the rigid point 21 and the actual pressure Pist.

Figure 6:
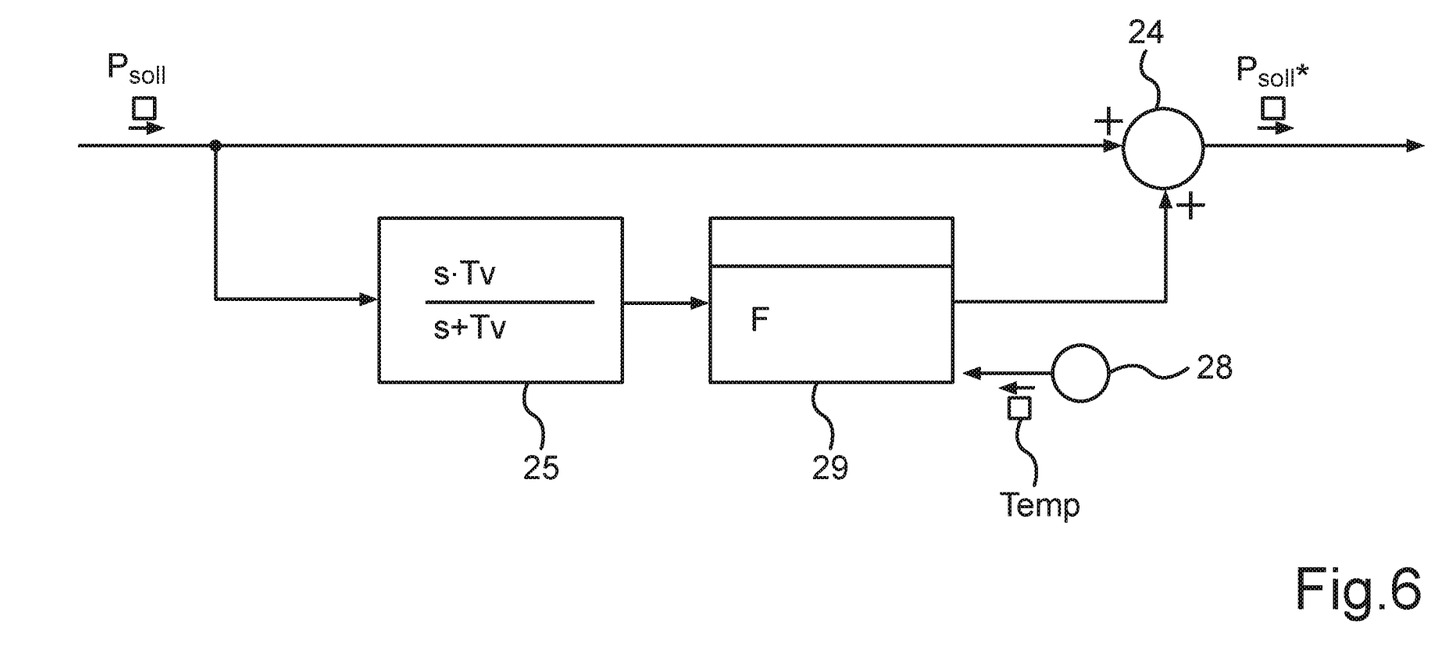

FIG. 6 shows how the derivative 25 in one configuration of the controller 7 can be realized on the basis of a filter, with it being possible to determine a suitable value for the time constant Tv by simple trials.

Figure 7:
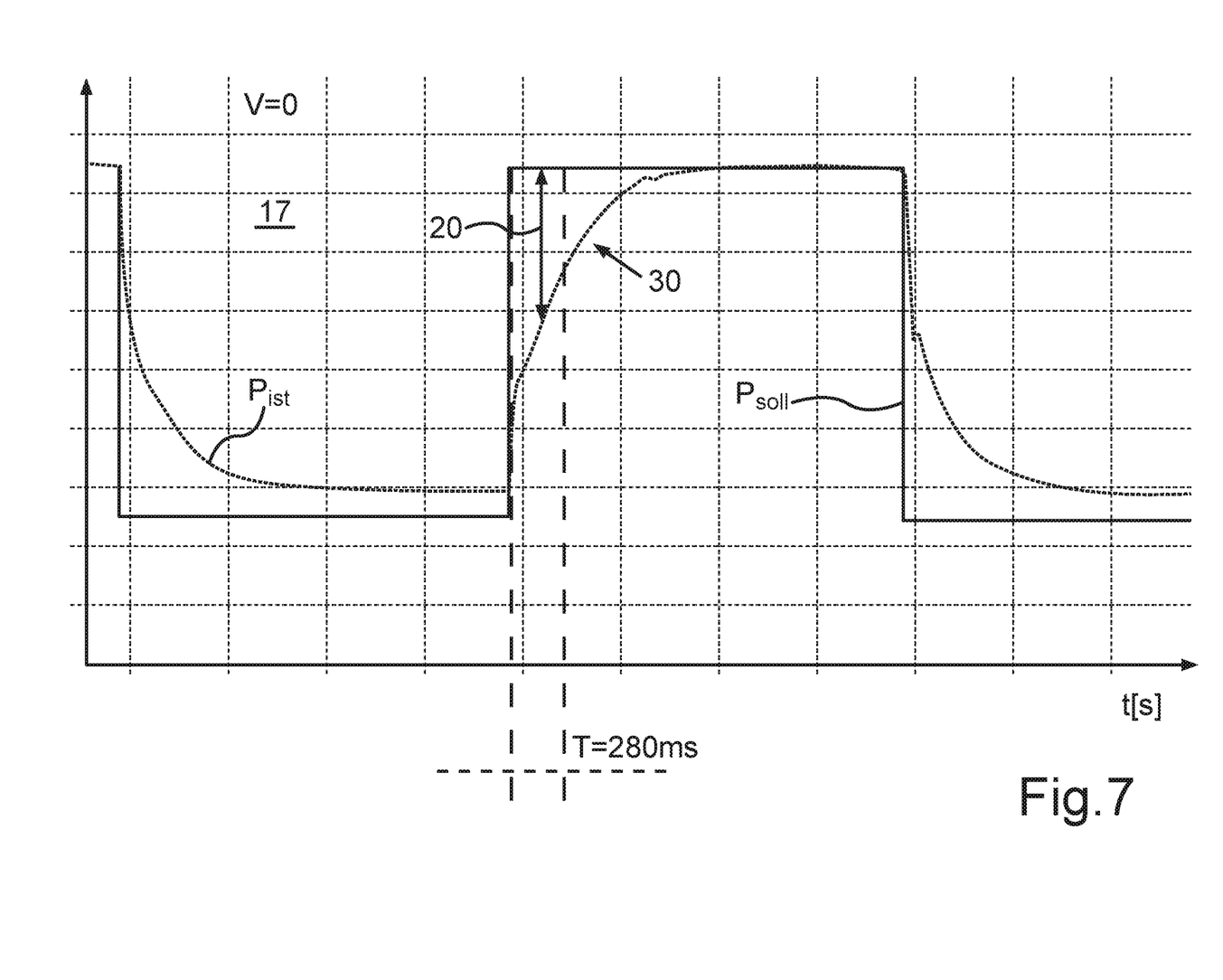
FIG. 7 a schematic illustration of a time course of a pressure signal.

FIG. 7 illustrates how, when the pilot control 23 (indicated as V=0) is switched off, the actual pressure value Pist in the soft region 17 responds to a jump or a rectangular course of the target value signal Psoll. On the basis of the course of the actual pressure Pist, it can be seen that subsystems are important for the pressure buildup in the soft region 17. Said subsystems are the clutch with the movement of the clutch cylinder (PT2 element, time constant approximately 2 milliseconds), the valve movement with its translational movement for setting the pressure (PT2 element, time constant approximately 8 to 13 milliseconds), and the pressure buildup behavior of the transmission clutch with the volume flow pressure amplification (PT1 element with time constant in the range of 220 milliseconds to 280 milliseconds). The volume flow describes the quantity of hydraulic fluid that is needed for a change in the pressure P.

On the basis of the time constants of the different subsystems, it can be seen that, in comparison, the pressure buildup is especially slow or dominant. For this purpose, the physical interpretation is that, for attaining a delta pressure in the soft region 17, a markedly higher volume flow is needed than in the rigid region 18. In the soft region 17, therefore, a volume flow pressure amplification is less than in the rigid region 18. Accordingly, it is possible, through compensation of said dynamics, to optimize the pressure response behavior. There is a reduction in the dominant dynamics of the pressure buildup; that is, the PT1 element (first-order time element) with its exponential behavior 30 is to be reduced by the tracking error 20. On the basis of the time course of the exponential rise 30, it can be determined that, for the specific transmission clutch 2, a time constant of T=280 milliseconds applies for the PT1 behavior. On the basis of the time constant T, the pilot control factor F can be determined. Thus, by way of this simple measure, it is possible, for different transmission clutches to generate a suitable characteristic field 29 in each case in order to be able to compensate for the respective tracking error 20.

Figure 8:
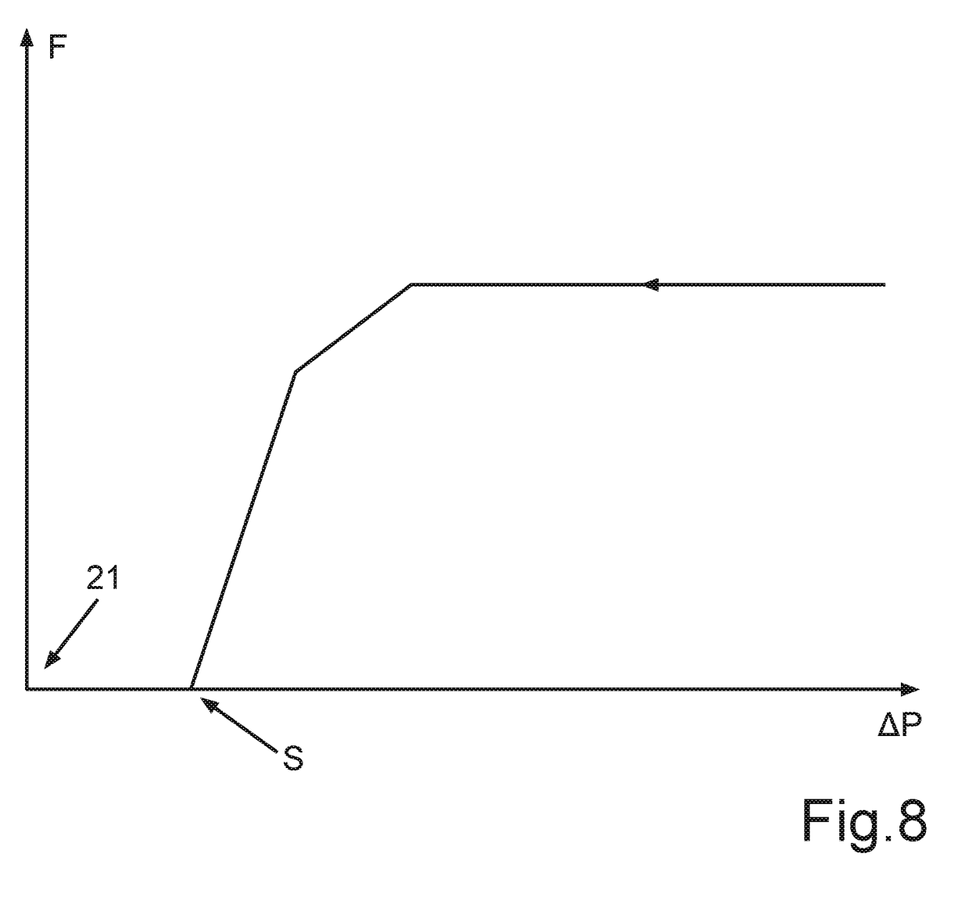
FIG. 8 a schematic illustration of a characteristic curve for a pilot control factor.

FIG. 8 illustrates how, in an advantageous way, not only the nonlinearity of the PT1 behavior can be combined, but it is also possible to retract the compensation when the rigid point is approached. When the pressure P declines, the pressure difference ΔP declines and the pilot control factor F is hereby gradually reduced to 0 for a threshold value S of the pilot control factor F. The threshold value S can lie in a range from 0 bar to 0.2 bar, for example at 0.1 bar.

Figure 9:
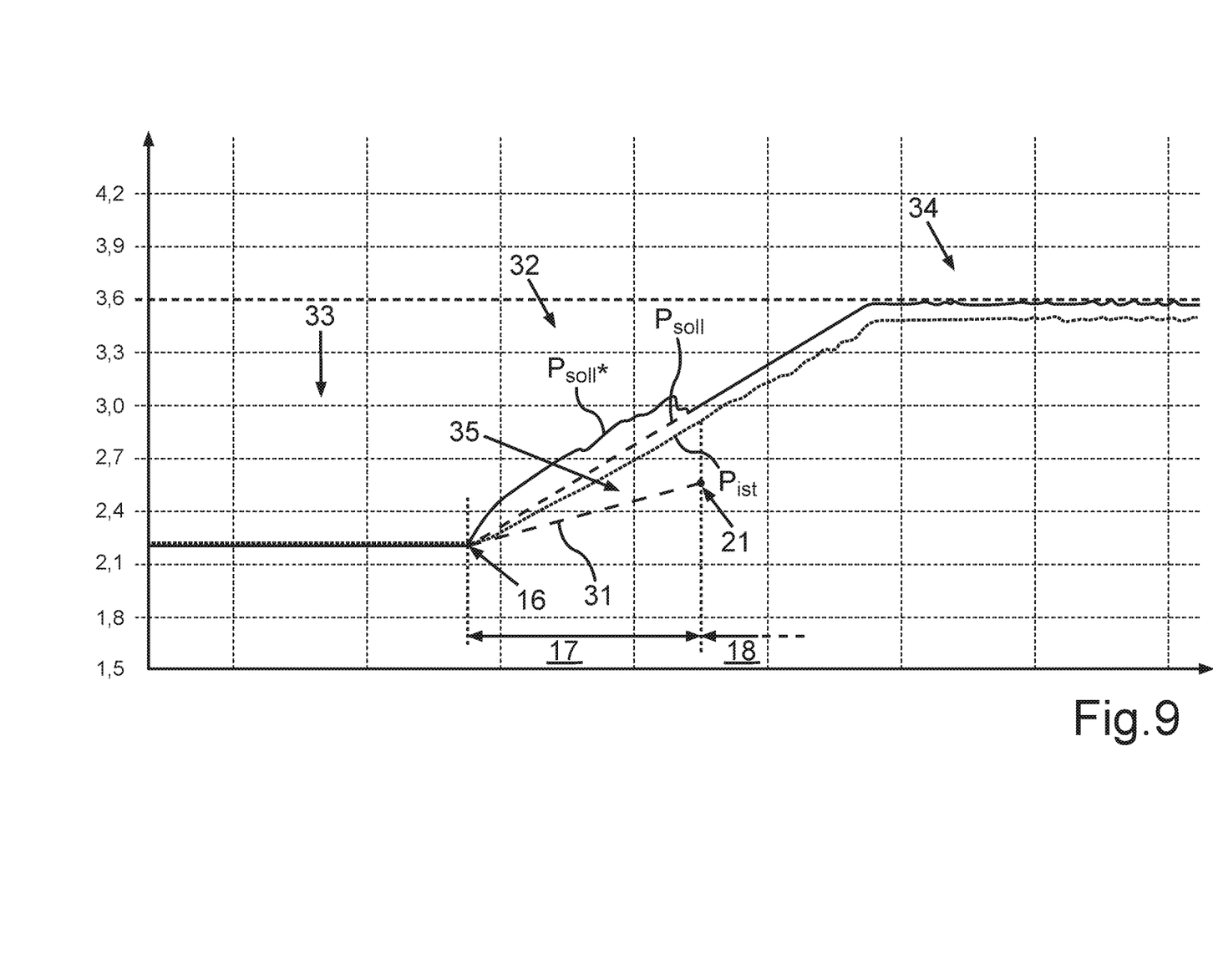
FIG. 9 a diagram with time courses of pressure signals and of a pilot control signal.

FIG. 9 illustrates how, with the described configuration, a time course of the actual pressure Pist that is similar in the soft region 17 and the rigid region 18 can be obtained. For this purpose, it is further illustrated how the time course of the final actuating value signal Psoll* progresses in distinction to the target value signal Psoll. It can be seen that the final actuating value signal Psoll* causes a greater volume flow of the hydraulic fluid in the hydraulic drive 11. As a further reference, the original course 31 of the actual pressure Pist is illustrated, as has already been explained in connection with FIG. 2.

Overall, during an entire disengagement operation 32 going from an engaged state 33 via the gripping point 16 through the soft region 17 via the rigid point 21 into the rigid region 18 up to the engaged state 34, a constant behavior of the transmission clutch 2 thus ensues for the user of the motor vehicle.

Figure 10:
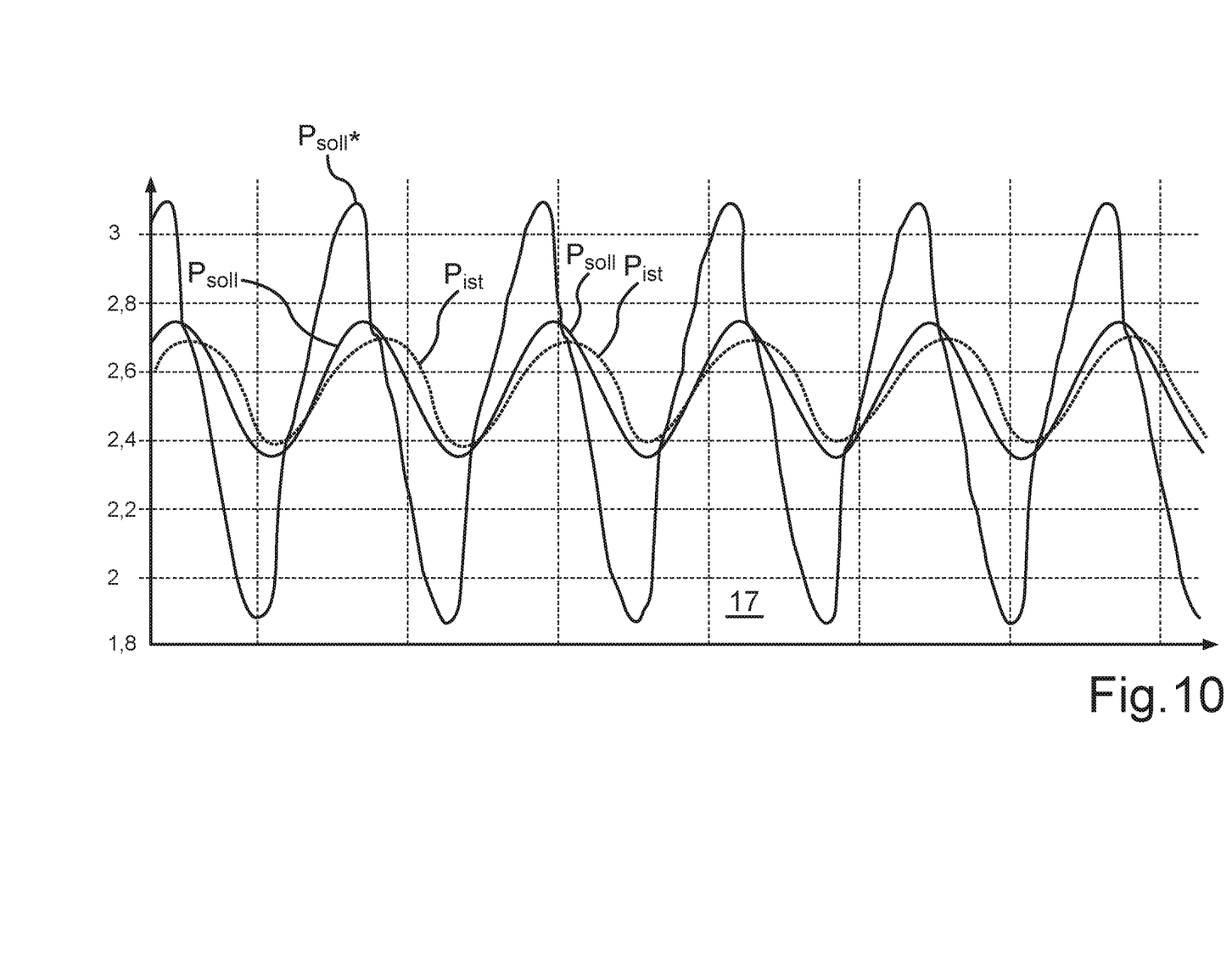
FIG. 10 a diagram with time courses of pressure signals and the pilot control signal for a periodic movement of a clutch pedal.

FIG. 10 illustrates, once again in comparison to FIG. 4, the behavior of the transmission clutch 2 in the case of periodic actuation. Illustrated is the final actuating value signal Psoll* and the resulting actual pressure signal Pist, which now, similarly to the case in the rigid region 18, also follows the preliminary target value signal Psoll in the soft region 17 with a smaller tracking error 20. Through the targeted pilot control of the dominant dynamics, it is then possible, in the soft region 17, to ensure a markedly greater pressure response behavior, so that a bandwidth increase for periodic movements of 1 Hertz up to 10 Hertz, for example, can be achieved. What thus results is an increased robustness in the shifting quality over the scatter width of the soft regions 17 of different transmission clutches. The typical resulting pressure antinode 35 during applications, such as, for example, approach ramps, startups, or intersections, is avoided.

Overall, the example shows how, by means of the invention, an adaptive pilot control can be provided for compensation of a soft region of a clutch.

The invention claimed is:

1. A method for operating an electrohydraulic transmission clutch of a motor vehicle, comprising:
    setting a hydraulic pressure for a clutch operation by way of a regulating device of a controller as a function of a clutch signal and
    moving a disengagement element of the transmission clutch through a soft region into a rigid region after a rigid point, or vice versa,
    wherein, as a function of the clutch signal, the regulating device generates a preliminary target value signal for the pressure, a time derivative of the preliminary target value signal is generated as a movement signal, a pilot control generates a pilot control signal as a function of the movement signal, and the preliminary target value signal and the pilot control signal are combined to give a final actuating value signal for the pressure as a control signal at a signal output to compensate for a pressure difference between the soft region and the rigid region, wherein in the rigid region a ratio of clutch movement to movement of a disengagement element is greater than the ratio of clutch movement to movement of the disengagement element with respect to linear displacement or pressure in the soft region, and wherein the pilot control is active only in the soft region.

2. The method according to claim 1, wherein, by way of the pilot control, the movement signal is scaled with a pilot control factor and the pilot control factor is set as a function of at least one operating variable of the motor vehicle.

3. The method according to claim 2, wherein, as the at least one operating variable, at least one temperature is recorded.

4. The method according to claim 2, wherein the pilot control factor is determined as a function of the at least one operating variable by means of an assignment device, and the assignment device is adapted in the operation of the motor vehicle, as a function of a time constant with which a time signal of the pressure follows the preliminary target value signal or the final actuating value signal.

5. The method according to claim 2, wherein the pilot control factor is set as a function of a difference between the actual pressure and a pressure that is obtained in the rigid point.

6. The method according to claim 1, further comprising:
    adjusting, by the controller, an actuating output for setting the hydraulic pressure for moving the disengagement element of the transmission clutch.

7. The method according to claim 6, wherein the controller is coupled to an electric actuator for setting the hydraulic pressure for moving a disengagement element of the transmission clutch.

* * * * *